US009110545B2

(12) United States Patent
Radivojevic et al.

(10) Patent No.: US 9,110,545 B2
(45) Date of Patent: Aug. 18, 2015

(54) APPARATUS AND ASSOCIATED METHODS

(75) Inventors: Zoran Radivojevic, Cambridge (GB); Paul Beecher, Cambridge (GB); Chris Bower, Ely (GB); Piers Andrew, Cambridge (GB); Darryl Cotton, Cambs (GB); Samiul Haque, Cambridge (GB); Michael Astley, Cambs (GB); Markus Ahonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 146 days.

(21) Appl. No.: 13/587,214

(22) Filed: Aug. 16, 2012

(65) Prior Publication Data

US 2014/0049505 A1 Feb. 20, 2014

(51) Int. Cl.
| | |
|---|---|
| G06F 3/044 | (2006.01) |
| G06F 3/01 | (2006.01) |
| G08B 6/00 | (2006.01) |
| G06F 3/0488 | (2013.01) |
| G06F 3/0354 | (2013.01) |

(52) U.S. Cl.
CPC ............... G06F 3/044 (2013.01); G06F 3/016 (2013.01); G06F 3/03547 (2013.01); G06F 3/04883 (2013.01); G06F 3/04886 (2013.01); G08B 6/00 (2013.01); G06F 2203/0339 (2013.01)

(58) Field of Classification Search
CPC . G06F 3/044; G06F 3/04886; G06F 3/03547; G06F 3/04883; G06F 2203/0339; G06F 3/016; G08B 6/00
USPC ................ 345/173, 174; 340/407.1, 407.2
See application file for complete search history.

(56) References Cited

U.S. PATENT DOCUMENTS

| | | | | |
|---|---|---|---|---|
| 7,202,859 | B1 * | 4/2007 | Speck et al. ................... | 345/174 |
| 2003/0076306 | A1 * | 4/2003 | Zadesky et al. ............... | 345/173 |
| 2009/0273573 | A1 * | 11/2009 | Hotelling ....................... | 345/173 |
| 2010/0295709 | A1 * | 11/2010 | Wu et al. .......................... | 341/15 |
| 2011/0069026 | A1 * | 3/2011 | Chen et al. ..................... | 345/173 |
| 2011/0079449 | A1 * | 4/2011 | Radivojevic ............... | 178/18.03 |
| 2011/0109573 | A1 * | 5/2011 | Deslippe et al. .............. | 345/173 |
| 2011/0261021 | A1 * | 10/2011 | Modarres et al. ............. | 345/177 |
| 2011/0279250 | A1 * | 11/2011 | Ryhanen et al. ........... | 340/407.2 |
| 2012/0268386 | A1 * | 10/2012 | Karamath et al. ............. | 345/173 |
| 2013/0016042 | A1 * | 1/2013 | Makinen et al. .............. | 345/168 |

FOREIGN PATENT DOCUMENTS

| | | |
|---|---|---|
| WO | WO 2010/066817 A2 | 6/2010 |
| WO | WO 2011/020944 A1 | 2/2011 |

* cited by examiner

*Primary Examiner* — Dwayne Bost
*Assistant Examiner* — Stefan M Oehrlein
(74) *Attorney, Agent, or Firm* — Harrington & Smith

(57) ABSTRACT

An apparatus including a plurality of adjacent repeated base units, each base unit formed from an active electrode of first, second and third touch sensor arrays, the first, second and third touch sensor arrays each including a plurality of active electrodes connected to a respective common terminal of the touch sensor array, wherein each base unit includes an active electrode of the second touch sensor array interlaced between an active electrode of the first touch sensor array and an active electrode of the third touch sensor array such that a swipe touch gesture applied to two or more adjacent active electrodes of the apparatus generates signalling at the respective common terminals of the corresponding touch sensor arrays which allows the direction of the swipe touch gesture to be determined.

15 Claims, 10 Drawing Sheets

$S_{22} \longrightarrow S_{32}$

1644 — Receive touch input signals from common terminals of two or more sensor arrays 1645 — Determine direction of swipe touch gesture based on order of touch input signals 1646 — Vary setting of device output according to determined direction of swipe touch gesture

APPARATUS AND ASSOCIATED METHODS

TECHNICAL FIELD

The present disclosure relates to the field of touch sensors and associated methods and apparatus, and in particular concerns an apparatus comprising an electrode configuration which allows the direction of a swipe touch gesture to be readily determined. Certain disclosed example aspects/embodiments relate to consumer appliances and devices in general, but may be particularly applicable to loudspeaker systems. In addition, certain disclosed example aspects/embodiments relate to so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

In touchscreen displays, a capacitive sensing matrix for touch detection is gaining greater adherence than traditional resistive touchscreen solutions. These sensing matrices are able to detect single touch inputs applied to individual touch sensors as well as swipe touch gestures applied to two or more adjacent touch sensors. The electrode arrangement and readout process currently used to determine the direction of a swipe touch gesture, however, may be considered to be unnecessarily cumbersome for certain applications.

The apparatus and methods disclosed herein may or may not address this issue.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising a plurality of adjacent repeated base units, each base unit formed from an active electrode of first, second and third touch sensor arrays, the first, second and third touch sensor arrays each comprising a plurality of active electrodes connected to a respective common terminal of the touch sensor array, wherein each base unit comprises an active electrode of the second touch sensor array interlaced between an active electrode of the first touch sensor array and an active electrode of the third touch sensor array such that a swipe touch gesture applied to two or more adjacent active electrodes of the apparatus generates signalling at the respective common terminals of the corresponding touch sensor arrays which allows the direction of the swipe touch gesture to be determined.

The two or more adjacent active electrodes to which the swipe touch gesture is applied may be two or more adjacent active electrodes of a single base unit. The two or more adjacent active electrodes to which the swipe gesture is applied may be two or more adjacent active electrodes spanning multiple adjacent base units.

The plurality of active electrodes of each touch sensor array may be formed from different serial length portions of the same continuous active electrode. The continuous active electrodes of the first, second and third touch sensor arrays may be configured to radiate spirally to form adjacent repeated base units which allow the direction of a radial swipe touch gesture to be determined.

The plurality of active electrodes of each touch sensor array may be formed from different parallel length portions of the same continuous active electrode. The different parallel length portions of each touch sensor array may be configured to extend parallel from the common terminal of the respective touch sensor array to form adjacent repeated base units which allow the direction of an axial swipe touch gesture to be determined.

The apparatus may be configured to monitor the sequence in which the signalling was generated at the respective common terminals of the corresponding touch sensor arrays to determine the direction of the swipe touch gesture.

The respective common terminals may be input and/or output terminals of the first, second and third touch sensor arrays.

The apparatus may be configured to vary the setting of a device output according to the determined direction of the swipe touch gesture. The device output may be one or more of the volume of a loudspeaker, the frequency response of an audio equalizer, the playback progress of an audio recording, the playback progress of a video recording, the brightness of an electronic display, the contrast of an electronic display, and the currently displayed visual content of an electronic display.

The apparatus may be configured to provide haptic feedback using the corresponding touch sensor arrays to indicate that the device output setting has been varied. The apparatus may be configured to provide the haptic feedback by applying a periodic potential to the active electrodes of the corresponding touch sensor arrays via the respective common terminals. The amplitude and/or frequency of the periodic potential may be indicative of the device output setting.

The apparatus may be configured to apply a periodic potential to the first, second and third touch sensor arrays via the respective common terminals to enable the swipe touch gesture to generate signalling at the respective common terminals of the corresponding touch sensor arrays. The periodic potential applied to the touch sensor arrays to enable the swipe touch gesture to generate signalling may be the same periodic potential applied to the touch sensor arrays to provide haptic feedback. The periodic potential applied to the touch sensor arrays to enable the swipe touch gesture to generate signalling may be different to the periodic potential applied to the touch sensor arrays to provide haptic feedback.

Each active electrode may be configured to couple capacitively to a stylus when the stylus is in proximity to the active electrode. Capacitive coupling between the active electrode and the stylus may be configured to generate a touch input signal and/or provide haptic feedback.

The term "stylus" may be taken to mean any object which is capable of holding electrical charge and which can be used to provide a touch input. The stylus may be made from an electrically conductive material or a dielectric material. The stylus may be a user of the apparatus (e.g. a user's finger), a conventional input stylus (e.g. a stylus as used with PDAs and the like), or a glove worn by a user of the apparatus (e.g. a glove comprising fingertips configured to hold electrical charge).

The apparatus may comprise a discrete ground electrode located remote from the first, second and third touch sensor arrays. The apparatus may comprise a plurality of ground electrodes connected to a respective common terminal. The plurality of ground electrodes may be interlaced between the active electrodes of the first, second and third touch sensor arrays such that each active electrode is located adjacent to a ground electrode of the plurality of ground electrodes.

Each active electrode may serve as the single electrode of a self-capacitive touch sensor. The stylus may form a capacitor with the active electrode when the stylus is in proximity to the electrode. Capacitive coupling between the active electrode and the stylus may be configured to cause a variation (increase or decrease depending on the stylus material) in the capacitance of the active electrode. The variation in capacitance may be between 1 fF and 5 pF.

Each active electrode may serve as the transmitter electrode of a mutually-capacitive touch sensor. In this scenario, an adjacent ground electrode of the plurality of ground electrodes may serve as the receiver electrode of the mutually-capacitive touch sensor. The active electrode may be configured to generate an electric field between itself and the ground electrode. The stylus may interfere with the electric field when the stylus is in proximity to the active electrode. Capacitive coupling between the active electrode and the stylus may cause a variation (increase or decrease depending on the stylus material) in the capacitance of the ground electrode. The variation in capacitance may be between 1 fF and 5 pF.

The apparatus may be one or more of an electronic device, a portable electronic device, a portable telecommunications device, a module for any of the aforementioned devices, an accessory for any of the aforementioned devices, a casing for any of the aforementioned devices, and a protective cover for any of the aforementioned devices.

The first, second and third touch sensor arrays may be formed from the casing. The first, second and third touch sensor arrays may be formed on top of the casing. The casing may comprise a layer of electrically conductive material coated with a layer of electrically insulating material. The layer of electrically conductive material may be patterned to form the first, second and third touch sensor arrays. The electrically conductive material may comprise one or more of aluminium, copper, gold, silver, carbon, graphene, zinc oxide, indium tin oxide and vanadium oxide (but is not limited to these materials). The electrically insulating material may comprise one or more of aluminium oxide, hafnia and a fluorinated polymer. The casing may comprise a substrate on which the patterned layer of electrically conductive material is supported. The substrate may comprise a polymer.

Each active electrode may have a width of between 1 and 10 mm. Each active electrode may be spaced from its adjacent active electrodes by a distance of between 0.1 and 0.3 mm. The electrically insulating material may have a thickness of 1 mm or less.

The casing may comprise physical and/or visual demarcations configured to enable location of the first, second and third touch sensor arrays. The physical demarcations may comprise one or more of a depression, a protrusion and a ridge in the casing.

According to a further aspect, there is provided an apparatus comprising a plurality of adjacent repeated base units, each base unit formed from an active electrode section of first, second and third touch sensors configured to radiate spirally, the first, second and third touch sensors each comprising a continuous active electrode connected to a respective terminal, the continuous active electrode comprising a plurality of serial electrode sections, wherein each base unit comprises an active electrode section of the second touch sensor interlaced between an active electrode section of the first touch sensor and an active electrode section of the third touch sensor such that a swipe touch gesture applied to two or more adjacent active electrode sections of the apparatus generates signalling at the respective terminals of the corresponding touch sensors which allows the direction of the swipe touch gesture to be determined.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

According to a further aspect, there is provided a method comprising determining the direction of a swipe touch gesture applied to two or more adjacent active electrodes of an apparatus, the apparatus comprising a plurality of adjacent repeated base units, each base unit formed from an active electrode of first, second and third touch sensor arrays, the first, second and third touch sensor arrays each comprising a plurality of active electrodes connected to a respective common terminal of the touch sensor array, wherein each base unit comprises an active electrode of the second touch sensor array interlaced between an active electrode of the first touch sensor array and an active electrode of the third touch sensor array, and wherein the direction of the swipe touch gesture is determined based on signalling generated at the respective common terminals of the corresponding touch sensor arrays by the swipe touch gesture.

According to a further aspect, there is provided a method comprising determining the direction of a swipe touch gesture applied to two or more adjacent active electrode sections of an apparatus, the apparatus comprising a plurality of adjacent repeated base units, each base unit formed from an active electrode section of first, second and third touch sensors configured to radiate spirally, the first, second and third touch sensors each comprising a continuous active electrode connected to a respective terminal, the continuous active electrode comprising a plurality of serial electrode sections, wherein each base unit comprises an active electrode section of the second touch sensor interlaced between an active electrode section of the first touch sensor and an active electrode section of the third touch sensor, and wherein the direction of the swipe touch gesture is determined based on signalling generated at the respective terminals of the corresponding touch sensors by the swipe touch gesture.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed are also within the present disclosure and encompassed by one or more of the described example embodiments.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

Touchscreen interfaces are electronic visual displays which can detect the presence and location of a touch input within the display/interface area. The term "touchscreen" generally refers to interfaces which interact with a user's finger, but most technologies can also sense other passive objects, such as a stylus. The touchscreen has two main attributes. Firstly, it enables a user to interact directly with what is displayed, rather than indirectly via an onscreen pointer. Secondly, it removes the need for any intermediate input device, such as a mouse or touchpad, which would otherwise be required for controlling the onscreen pointer.

A variety of different touchscreen technologies currently exist. One of these is capacitive touchscreen technology, which encompasses both self-capacitive systems and mutually-capacitive systems.

Figure 1A:
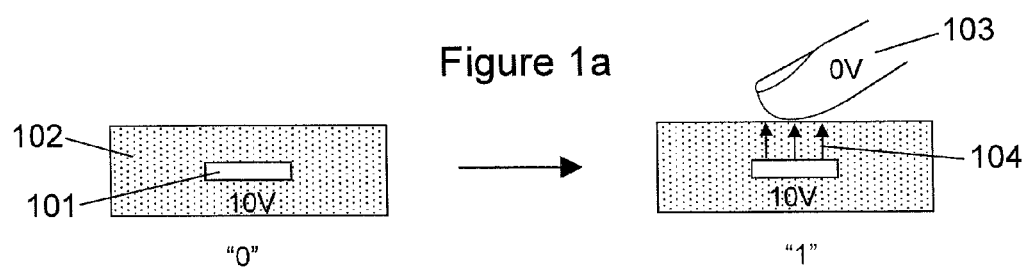
FIG. 1a shows a self-capacitive touch sensor.

A self-capacitive touch sensor (as illustrated in FIG. 1a) comprises an electrical conductor 101 (electrode) separated from the external environment by an electrical insulator 102. An electrostatic potential (10V in the examples illustrated) is applied to charge the electrode 101. When the user's finger 103 or a stylus (which will usually be grounded) is brought into proximity of the charged electrode 101 (e.g. by touching the electrical insulator 102), opposite charges are induced on the finger/stylus 103 and an electric field 104 is formed therebetween (i.e. the electrode 101 couples capacitively to the user/stylus 103). The electrode 101 and the user/stylus 103 effectively serve as the opposite plates of a (dynamic) capacitor. Therefore, when the user/stylus 103 approaches the sensor, the total capacitance associated with the electrode 101 increases (typically by 1 fF-5 pF). This change in capacitance is then detected, and if the change exceeds a predetermined threshold value, the sensor interprets this as a touch input. As shown in FIG. 1a, the sensor changes from a "0" state (no touch input) to a "1" state (touch input detected).

A mutually-capacitive touch sensor (as illustrated in FIG. 1 b), however, comprises first 105 and second 106 electrical conductors (transmitter 105 and receiver 106 electrodes). A potential is applied to charge the transmitter electrode 105, which generates an electric field 104 between itself and the receiver electrode 106. The transmitter 105 and receiver 106 electrodes effectively serve as the opposite plates of a capacitor, and the capacitance associated with the receiver electrode 106 is measured. In the example shown, the electrodes 105, 106 lie in the same plane (i.e. a horizontally-arranged mutually-capacitive sensor). In this configuration, the stray field lines 104 extend above the plane of the electrodes 105, 106 into the region external to the device. When the user's finger 103 or a stylus (which is grounded) is brought into proximity of the sensor, the finger/stylus 103 interferes with the electric field 104 (i.e. the transmitter electrode 105 couples capacitively to the user/stylus 103). In this way, the capacitance associated with the receiver electrode 106 decreases (typically by 1 fF-5 pF). As with the self-capacitive touch sensor, the change in capacitance is detected. If the change exceeds a predetermined threshold value, the sensor interprets this as a touch input.

To increase the resolution of a mutually-capacitive touch sensor array, the transmitter 105 and receiver 106 electrodes of each sensor may be arranged one on top of the other (i.e. a vertically-arranged mutually-capacitive sensor). This arrangement is illustrated in FIG. 1c. In this configuration, the user's finger/stylus 103 couples capacitively to the transmitter electrode 105 (similar to the electrode 101 of a self-capacitive sensor), causing a decrease in the capacitance associated with the receiver electrode 106.

Figure 2A:
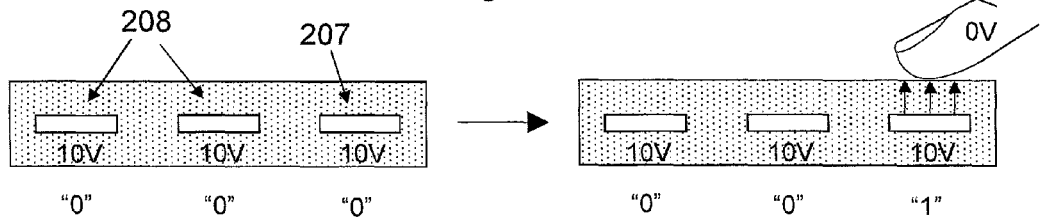
FIG. 2a shows the detection of a single touch input using an array of self-capacitive touch sensors.

Touchscreen displays typically comprise a two-dimensional array (matrix) of capacitive touch sensors. This arrangement allows the user to interact directly with content displayed at different regions of the display. FIG. 2a shows the detection of a single touch input using a sensor array. As can be seen, the user's finger/stylus 203 causes an increase in capacitance at one of the self-capacitive sensors 207, but not the others 208. As a result, the system detects a touch input at this sensor 207 only (i.e. the state switches from "0" to "1"). The same applies to an array of mutually-capacitive touch sensors, where the user's finger/stylus reduces the capacitance at the receiver electrode of the sensor in proximity to the finger/stylus but not at the receiver electrode of the other sensor(s).

By using an array of capacitive touch sensors, it is also possible to pin-point the position of touch by averaging the signals from multiple sensors. This is useful when the touch input lies between adjacent sensors or spans multiple sensors. Nevertheless, although this allows the detection of touch inputs which lie between adjacent sensors, the detection tends to be more accurate when the position of touch coincides with the position of a sensor. For this reason, a greater density of sensors is usually advantageous.

Figure 2B:
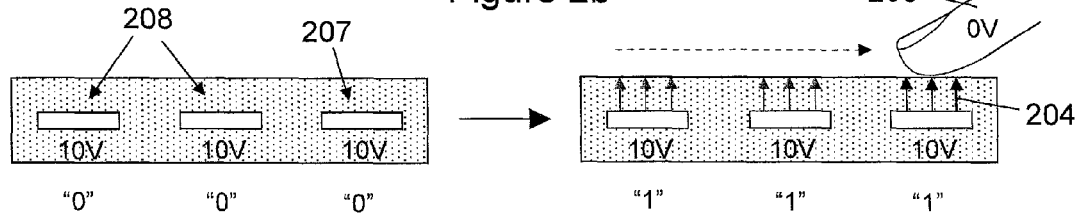
FIG. 2b shows the detection of a swipe touch gesture using an array of self-capacitive touch sensors.

FIG. 2b shows how the sensor array can be used to detect a swipe touch gesture. As the name suggests, a swipe touch gesture (or swipe input) involves the user sliding his or her finger/stylus 203 across the surface of the touchscreen display. As the user's finger/stylus 203 moves across the surface, any sensors which come into proximity of the finger/stylus 203 (e.g. directly under the finger/stylus 203) are progressively activated. This is illustrated by the electric field lines 204 at the respective sensors 207, 208 and the change of state from "0" to "1".

Touch input signals are generated by the activated sensors. As stated above, a touch input causes a change in the capacitance of the corresponding sensor electrode. Depending on the specific readout mechanism adopted, however, the touch input signals may comprise an absolute capacitance, current and/or voltage value associated with the activated sensors, or may comprise a change in the capacitance, current and/or voltage value associated with the activated sensors. The touch input signals are then detected/received by a system processor, which determines the direction of the swipe touch gesture based on the order in which the touch input signals were generated or received, and then initiates/performs an operation associated with the determined direction of the swipe touch gesture. The operation may, for example, comprise changing the content which is currently being displayed on the touchscreen.

Figure 3:
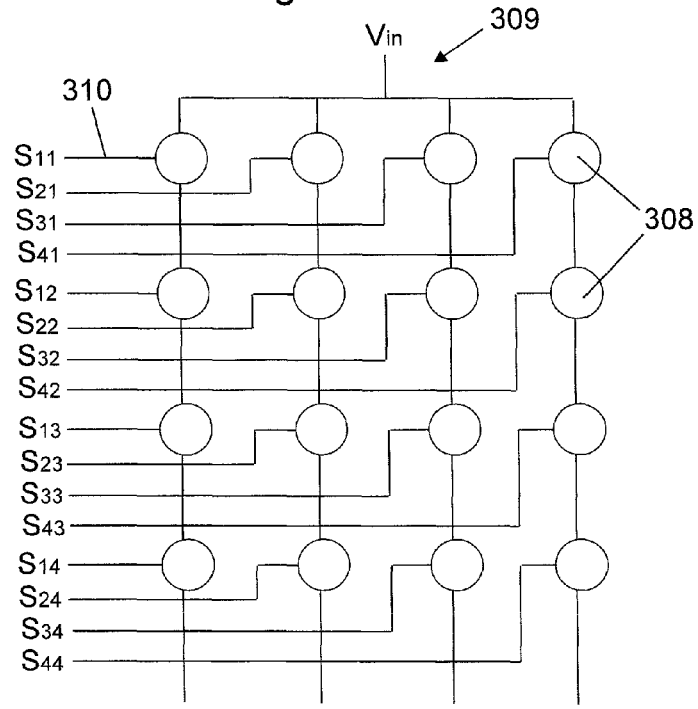
FIG. 3 shows a readout architecture currently used for detecting a swipe touch gesture (plan view)
Figure 4:
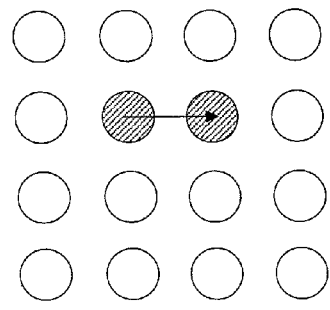
FIG. 4 shows the output signals generated by a swipe touch gesture applied to two sensors of the array shown in FIG. 3 (plan view)

One existing touchscreen architecture used for reading out touch input signals generated by the activated sensors is shown in FIG. 3. This architecture involves a multiplexed input terminal 309 for applying a potential to the array of sensors 308, and an individual output terminal 310 from each sensor of the array. A processor monitors the capacitance, current and/or voltage associated with each sensor. When touch inputs are applied to one or more of the sensors, the touch input signals generated by the touch inputs are received by the processor via the respective output terminals and analysed. The touch input signals in FIG. 4 are denoted by the specific location (x and y co-ordinates) of the corresponding sensors within the array. FIG. 4 shows a swipe touch gesture applied to two of the sensors. In this example, the swipe touch gesture has caused the sequential activation of sensors (2,2) and (3,2), thereby generating corresponding touch input signals $(S_{22})$ and $(S_{32})$. Since the processor is aware of the specific location of each sensor of the array and the order in which the touch input signals were generated or received, it is able to determine that a swipe touch gesture spanning sensors (2,2) and (3,2) was applied from left to right across the touchscreen.

Although the foregoing discussion is in relation to touchscreens, it will be appreciated that touch input provided by virtue of a touch user interface does not necessarily require a visual display.

As mentioned briefly in the background section, the electrode arrangement and readout process described above may be considered to be unnecessarily cumbersome for certain applications. In some cases, determination of the direction (and possibly also the length) of a swipe gesture may be sufficient, without the need to know exactly which electrodes were activated. One situation where this may apply is when the swipe touch gesture is used to vary a bidirectional setting of a device output. The device output may be the volume of a loudspeaker, the frequency response of an audio equalizer, the playback progress of an audio recording, the playback progress of a video recording, the brightness of an electronic display, the contrast of an electronic display, or the currently displayed visual content (such as a digital photograph or a region of a webpage) of an electronic display to name but a few examples. In this scenario, a more simplistic electrode arrangement and readout process may be used to determine the direction (and possibly also the length) of the swipe touch gesture.

Figure 5:
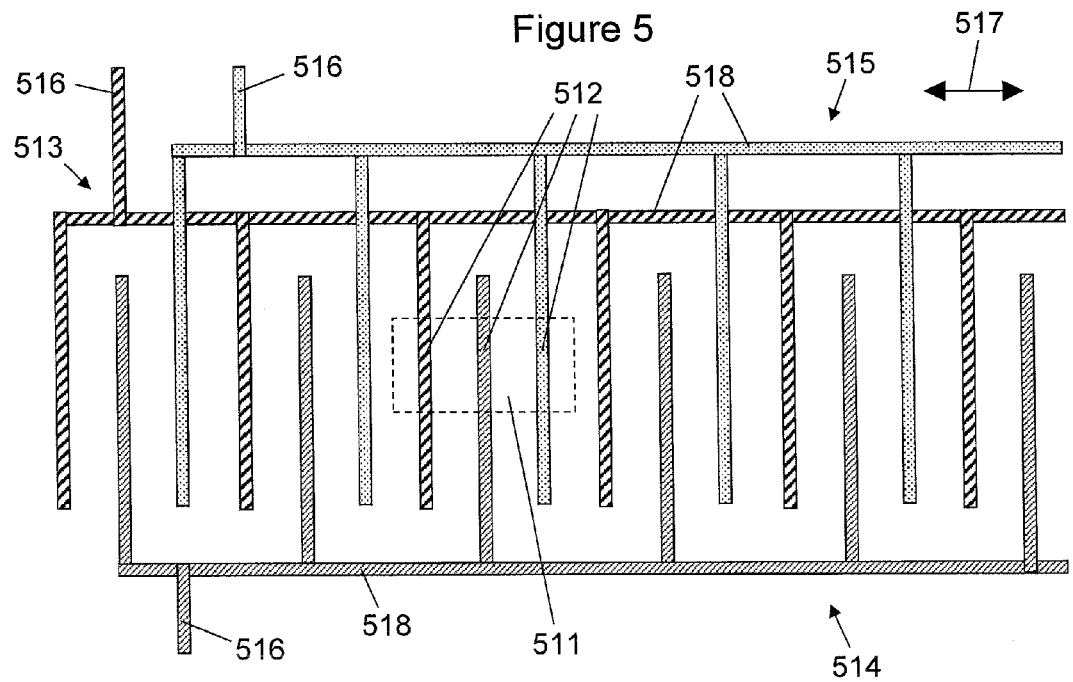
FIG. 5 shows a first electrode arrangement according to the present disclosure (plan view)

One example of such an electrode arrangement is illustrated in FIG. 5 in plan view. The apparatus comprises a plurality of adjacent repeated base units 511, each base unit 511 formed from an active electrode 512 of first 513, second 514 and third 515 touch sensor arrays. The first 513, second 514 and third 515 touch sensor arrays each comprise a plurality of active electrodes 512 connected to a respective common terminal 516 (input and/or output terminal) of the touch sensor array 513, 514, 515, and each base unit 511 comprises an active electrode 512 of the second touch sensor array 514 interlaced between an active electrode 512 of the first touch sensor array 513 and an active electrode 512 of the third touch sensor array 514. In this way, a swipe touch gesture applied to two or more adjacent active electrodes 512 (of a single base unit 511 or spanning multiple adjacent base units 511) of the apparatus generates signaling at the respective common terminals 516 of the corresponding touch sensor arrays 513, 514, 515 which allows the direction of the swipe touch gesture to be determined.

In this example, the plurality of active electrodes 512 of each touch sensor array 513, 514, 515 are formed from different parallel length portions of the same continuous active electrode 518 which extend parallel from the common terminal 516 of the respective touch sensor array 513, 514, 515. This configuration allows the direction of a swipe touch gesture applied along one axis 517 to be determined (i.e. the electrode configuration shown in FIG. 5 can distinguish between movement in the left or right directions). This electrode configuration works because the sequence ($S_1 \rightarrow S_2$, $S_2 \rightarrow S_3$ or $S_3 \rightarrow S_1$) of two consecutive touch input signals generated at the common terminals 516 by a swipe touch gesture in the right direction is always different from the sequence ($S_3 \rightarrow S_2$, $S_2 \rightarrow S_1$ or $S_1 \rightarrow S_3$) of two consecutive touch input signals generated at the common terminals 516 by a swipe touch gesture in the left direction. For example, if the processor detects/receives signal sequence $S_2 \rightarrow S_3$, it knows that this sequence can only be generated by a swipe touch gesture moving from left to right. This would not be the case, however, if the apparatus comprised only two touch sensor arrays. In this touch sensor scenario, the only possible signal sequences are $S_1 \rightarrow S_2$ and $S_2 \rightarrow S_1$, and these could be generated by a swipe touch gesture moving from left to right, or by a swipe touch gesture moving from right to left (i.e. it would be impossible for the processor to determine the direction of swipe based solely on the detected/received signal sequence).

It will also be appreciated that adjacent base units 511 are repeated in the same order (i.e. 1, 2, 3, 1, 2, 3, 1, 2, 3, etc) and not in reverse order (i.e. 1, 2, 3, 3, 2, 1, 1, 2, 3, etc) to allow the direction to be reliably determined.

Figure 6:
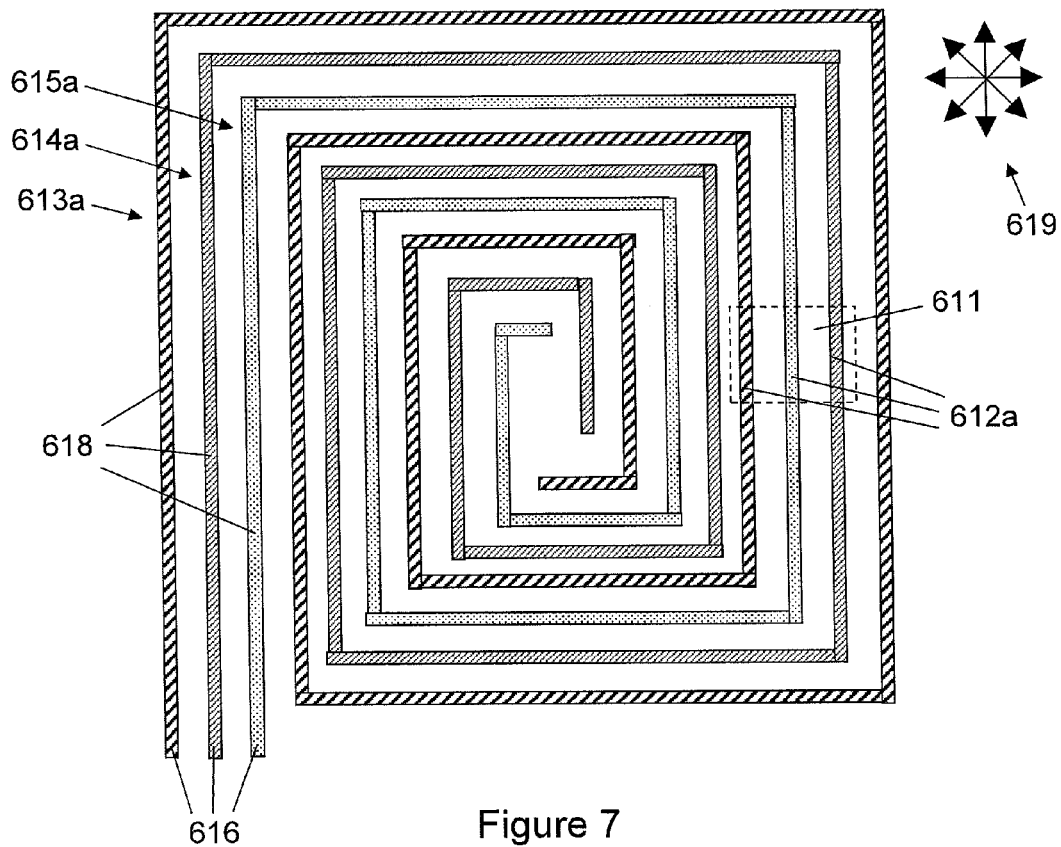
FIG. 6 shows a second electrode arrangement according to the present disclosure (plan view)
Figure 7:
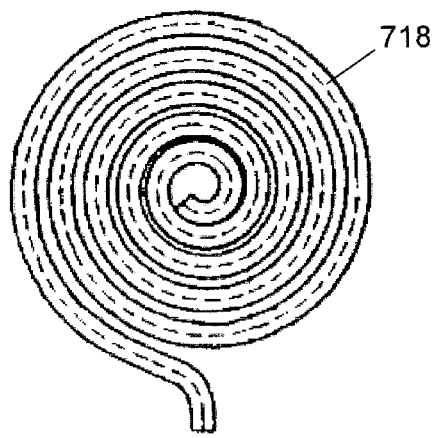
FIG. 7 shows a third electrode arrangement according to the present disclosure (plan view)

Another electrode configuration which could be used to achieve this functionality is shown in FIG. 6. This time, the plurality of active electrodes 612 of each sensor array are formed from different serial length portions of the same continuous active electrode 618, and the continuous active electrodes 618 of the first, second and third touch sensor arrays are configured to radiate spirally (in this case in a square/rectangular arrangement). The common terminals (input and/or output terminals) in this case are simply the outer ends of the continuous active electrodes 618. This configuration allows the direction of a swipe touch gesture applied along any radial axis 619 to be determined (i.e. the electrode configuration shown in FIG. 6 can distinguish between inward and outward radial movement). In this example, the continuous electrodes 618 of the first, second and third touch sensor arrays are formed from straight length portions to produce an electrode configuration with a square/rectangular footprint. Another option, however, is to form each continuous electrode 718 from curved or circular length portions (as shown in FIG. 7) to produce an electrode configuration with a circular footprint. One advantage of the latter configuration is that the distance between two adjacent active electrodes 612 is the same along each radial axis 619.

The electrode configurations shown in FIGS. 6 and 7 may also be described as comprising a plurality of adjacent repeated base units 611, each base unit 611 formed from an active electrode section 612a of first 613a, second 614a and third 615a touch sensors configured to radiate spirally. Based on this description, the first 613a, second 614a and third 615a touch sensors each comprise a continuous active electrode 618 connected to a respective terminal 616 (input and/or output terminal), the continuous active electrode 618 comprising a plurality of serial electrode sections 612a. Furthermore, each base unit 611 comprises an active electrode section 612a of the second touch sensor 614a interlaced between an active electrode section 612a of the first touch sensor 613a and an active electrode section 612a of the third touch sensor 615a such that a swipe touch gesture applied to two or more adjacent active electrode sections 612a (of a single base unit 611 or spanning multiple adjacent base units 611) of the apparatus generates signalling at the respective terminals 616 of the corresponding touch sensors 613a, 614a, 615a which allows the direction of the swipe touch gesture to be determined.

As mentioned above, the apparatus may be configured to vary the setting of a device output according to the determined direction of the swipe touch gesture. To achieve this, the variation in the device output setting for each axial direction would typically be predefined. For example, the configuration of FIG. 5 may be configured such that movement from left to right causes an increase in a particular device output setting, and movement from right to left causes a decrease in that particular device output setting. Similarly, the configuration of FIG. 6 may be configured such that movement outward from the centre of the electrode arrangement causes an increase in a particular device output setting, and movement inward towards the centre of the electrode arrangement causes a decrease in that particular device output setting.

The extent to which the device output setting is varied is also an important consideration. For some applications, the device output setting may increase or decrease by a single predefined value regardless of the length of the swipe touch gesture, whilst for other applications, the variation in the device output setting may be determined by the length of the swipe touch gesture. In the latter scenario, the apparatus may be configured such that movement of the user's finger/stylus from one active electrode to the next varies the device output setting by a predefined value (which may be an absolute or relative value). Therefore, a larger swipe touch gesture spanning three or more adjacent active electrodes would vary the device output setting by a greater amount than a smaller swipe touch gesture spanning only two adjacent active electrodes. As with most device output settings, however, there would normally be maximum and minimum values. These values may be dictated by physical limitations of the device hardware (e.g. the maximum volume or frequency of a loudspeaker), or simply by the end points of a media content (e.g. the top and bottom of a displayed webpage).

As well as detecting the direction of a swipe touch gesture and varying the setting of a device output according to the determined direction of the swipe touch gesture, the apparatus may be configured to provide haptic feedback using the touch sensor arrays (or at least the touch sensor arrays activated by the swipe touch gesture) to indicate that the device output setting has been varied.

Haptic (or tactile) feedback technology takes advantage of a user's sense of touch by applying forces, vibrations, and/or motions upon the user to convey information. In the past, haptic feedback has been used to assist in the creation and control of virtual objects (i.e. objects existing only in a computer simulation), and to enhance control of remote machines and devices.

More recently, however, haptic feedback has been used in portable electronic devices to supplement visual content. For example, some devices use haptic technology to produce vibrations in response to touch. This may be combined with touch-sensitive screens, where the vibrations can be used to acknowledge selection of on-screen content by the user. In other devices, vibrations have been used to direct a user to a particular on-screen feature, and even to create a tactile representation of an image to enable perception of displayed content with reduced cognitive effort.

One existing method of generating vibrations in the skin is to incorporate an electrotactile system in the display of an electronic device. This technology is based on electrovibration, in which mechanoreceptors in the skin are deceived into perceiving texture when a fingertip is swiped across an insulating layer above an electrical conductor carrying an alternating potential. This effect is due to the varying electrostatic attraction between the conductor and the deeper, liquid-rich conducting layers of the skin—an effect which changes the perceived dynamic function.

Figure 8:
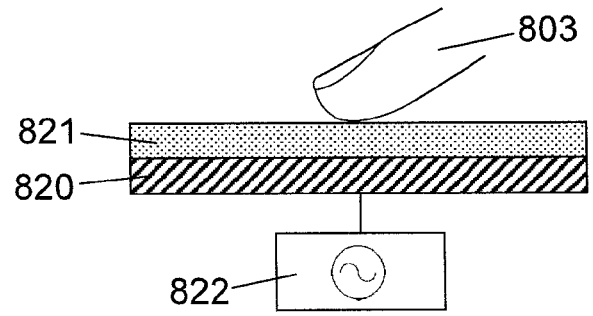
FIG. 8 shows an apparatus configured to provide haptic feedback.

FIG. 8 shows an example of an electrotactile system. The electrotactile system comprises an electrically conductive layer 820 (referred to herein as the electrotactile layer), an electrically insulating layer 821 and a power supply 822, the electrically insulating layer 821 positioned between a user 803 of the device and the electrotactile layer 820. The power supply 822 is configured to charge the electrotactile layer 820, and the electrically insulating layer 821 is configured to prevent a flow of current between the electrotactile layer 820 and the skin of the user 803 when the user 803 is proximate to the electrotactile layer 820.

When the power supply 822 charges the electrotactile layer 820, the surface charge induces charges of opposite polarity on the skin of the user 803, thereby forming an electric field between the user 803 and the electrotactile layer 820. This may be visualised as a (dynamic) capacitor, where the electrotactile layer 820 is the first electrode and the user 803 is the second electrode, the first and second electrodes separated by an electrical insulator 821. The electrostatic force generated by the charge on the electrotactile layer 820 attracts the charge on the user 803 causing movement of the user's skin.

To generate vibration in the skin of the user 803, the power supply 822 varies the magnitude (and/or polarity) of charge on the electrotactile layer 820 periodically. The variation of charge causes variations in electric field strength (and/or direction) which in turn causes vibrations in the skin. By controlling the electric field strength, it is possible to tune the amplitude and frequency of the skin vibrations to a specific mechanoreceptor. Unlike some other types of haptic feedback technology, physical contact between the user 803 and the device is not required because the electrotactile layer 820 couples capacitively to the user's skin, or any other stylus, via the electric field (i.e. action at a distance).

Figure 9:
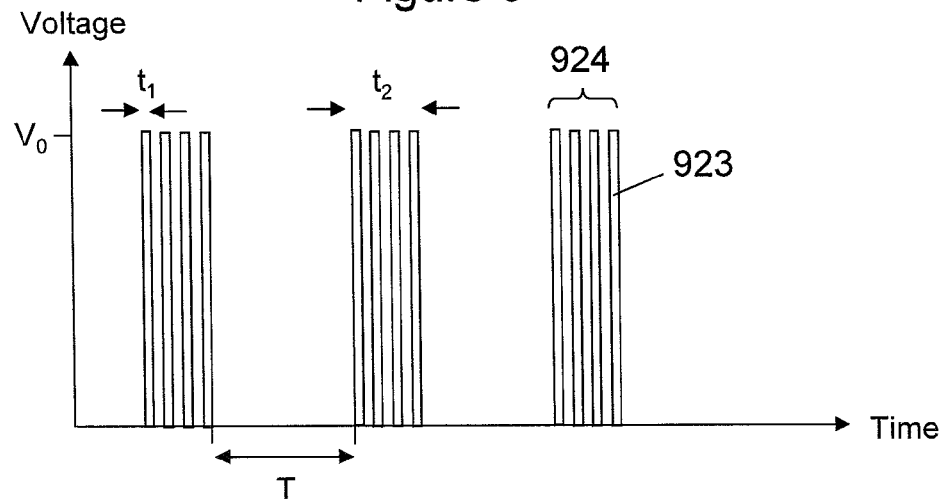
FIG. 9 shows a typical electrotactile signal for providing haptic feedback.

As shown in FIG. 9, an electrotactile signal for providing haptic feedback comprises a train of short, sharp pulses 923 (with an amplitude $V_0$ and a typical duration $t_1$ of 10-50 μs) which are grouped together to form a basic pulse 924 (with an amplitude $V_0$ and a typical duration $t_2$ of 0.5-2 ms). The frequency of the basic pulses 924 is what determines the perceived frequency of vibration in the haptic feedback.

Measurement circuits for existing capacitive touch sensor arrays are capable of scanning the array (to determine whether a touch input has been applied or not) at a frequency of up to 1200 Hz, possibly higher. Scanning involves periodically applying a potential to each electrode of the array and measuring the capacitance associated with each electrode. Therefore, if the frequency of the basic electrotactile pulses 924 is set to 10-500 Hz, there is a sufficient time window T for the measurement circuit to detect a touch input between voltage pulses. For example, if the basic electrotactile pulses 924 have a frequency of 10 Hz, the measurement circuit could scan the electrodes up to 120 times in the time period (T). As a result, the active electrodes could be used to detect touch inputs when haptic feedback is not being applied, and also between the basic pulses 924 when haptic feedback is being applied.

The apparatus described herein may be configured to provide haptic feedback by applying a periodic potential to the active electrodes of the touch sensor arrays via the respective common terminals. The haptic feedback may be used to let the user know that the device output setting has been varied, it may be used to indicate the current value (magnitude) of the device output setting, or it may be used to indicate the change in value (magnitude) of the device output setting. When the haptic feedback is merely being used to provide an indication that the device output setting has been varied, the properties of the vibration induced in the user's skin are not particularly important provided that the vibration can be detected. On the other hand, if the haptic feedback is being used to convey quantitative information about the device output setting, then the properties of the vibration are significant. In this respect, the apparatus may be configured to indicate the magnitude or change in magnitude of the device output setting by controlling the amplitude and/or frequency of the periodic potential applied to the active electrodes. For example, if the user increases the volume or frequency of an audio output by a factor of two, the apparatus may double the amplitude or frequency of the periodic potential to create a vibration in the user's skin which is indicative of the audio output.

Another option is to apply a different frequency of periodic potential to each of the respective sensor arrays. In this way, the user would be able to determine if the device output setting has been increased or decreased based on the sequence of detected vibrations. For example, if the periodic potentials applied to the first, second and third sensor arrays were 20 Hz, 40 Hz and 80 Hz, respectively, the user would feel a corresponding sequence of vibrations as he provides a swipe touch gesture. If the swipe touch gesture was provided from left to right across the electrode arrangement of FIG. 5, for example, the detected sequence of vibrations would be 20 Hz, 40 Hz, 80 Hz, 20 Hz, 40 Hz, 80 Hz, etc. On the other hand, if the swipe touch gesture was provided from right to left across the electrode arrangement of FIG. 5, the detected sequence of vibrations would be 80 Hz, 40 Hz, 20 Hz, 80 Hz, 40 Hz, 20 Hz. The absolute or relative frequencies used are not particularly important provided that the user is able to detect and distinguish between the different vibrations.

Figure 18:
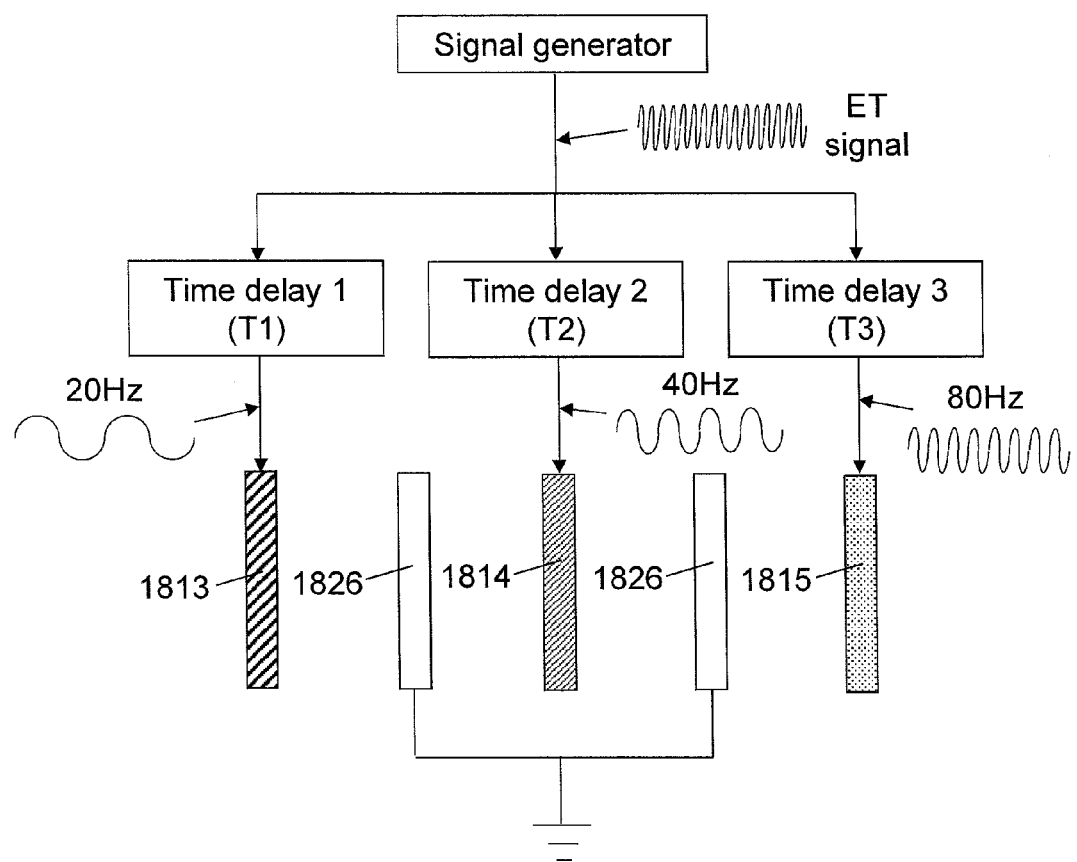
FIG. 18 shows circuitry for applying a different frequency of periodic potential to each of the respective sensor arrays.

This feature may be implemented using the circuit of FIG. 18 (although alternative, and possibly more complex, circuitry could be used instead). The circuit comprises a signal generator and first, second and third time delay circuits. The first, second and third time delay circuits are connected to the active electrodes of the first 1813, second 1814 and third 1815 sensor arrays, respectively. Additional ground electrodes 1826 (described later) can be seen between adjacent active electrodes. The signal generator generates a single periodic potential (ET signal) similar to the train of short, sharp pulses 923 shown in FIG. 9 but without the basic pulses 924. This single periodic potential is then passed to each of the first, second and third time delay circuits, which periodically delay the signal by different predefined amounts to produce basic pulses 924 of different frequency (e.g. 20 Hz, 40 Hz and 80 Hz, respectively) and period (T1, T2 and T3, respectively). In this way, only the 20 Hz pulsed signal is applied to the electrodes of the first sensor array 1813, only the 40 Hz pulsed signal is applied to the electrodes of the second sensor array 1814, and only the 80 Hz pulsed signal is applied to the electrodes of the third sensor array 1815. Different vibrations in the user's skin can therefore be produced by the different sensor arrays using a single input frequency.

Figure 10A:
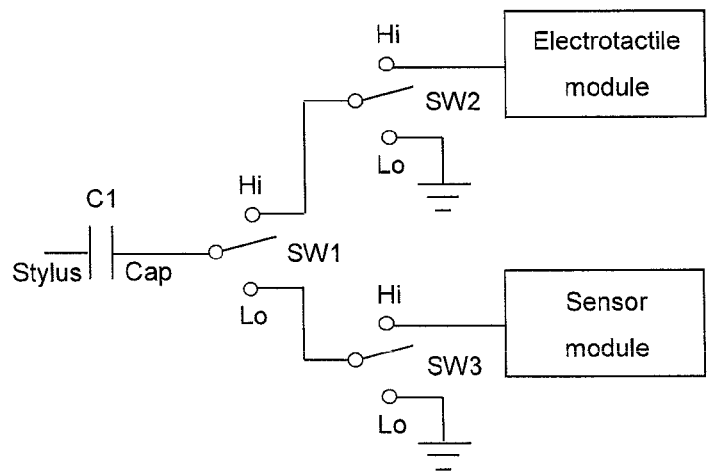
FIG. 10a shows how a series of switches can be used to enable the electrode of a self-capacitive touch sensor to detect touch inputs and provide haptic feedback alternatively.

FIG. 10a shows one possible circuit diagram for controlling an active electrode of a self-capacitive touch sensor so that it can be used for detecting touch inputs and providing haptic feedback alternatively. The active electrode (Cap) forms a capacitor (C1) with a user's finger/stylus, and the circuit comprises three switches (SW1-SW3) which are operated simultaneously as follows:

To use the active electrode for detecting touch inputs, switches SW1, SW2 and SW3 are set to "low", "low", and "high", respectively (although switch SW2 could be left floating rather than being grounded). In this configuration, the active electrode is connected to a sensor module. The sensor module comprises a sensor power supply, a sensor control circuit, and a sensor measurement circuit, and is used to operate the active electrode as a sensor. The sensor power supply is configured to apply a voltage to the active electrode, the sensor control circuit is configured to control the voltage applied to the active electrode, and the sensor measurement circuit is configured to measure the capacitance, voltage or current associated with the active electrode and determine whether or not a touch input has occurred (e.g. by comparing the change in capacitance, voltage or current with a predetermined threshold value).

To use the active electrode for providing haptic feedback, on the other hand, switches SW1, SW2 and SW3 are set to "hi", "hi", and "low", respectively (although switch SW3 could be left floating rather than being grounded). In this configuration, the active electrode is connected to an electrotactile module. The electrotactile module comprises an electrotactile power supply, an electrotactile control circuit, and a stylus ground, and is used to operate the active electrode as an electrotactile element. The electrotactile power supply is configured to apply a voltage (e.g. an alternating voltage) to the active electrode, the electrotactile control circuit is configured to control the voltage applied to the active electrode (e.g. the amplitude, frequency, duration and/or polarity of the electrotactile signal), and the stylus ground is configured to ground the user/stylus when the user/stylus is in proximity to the active electrode. The stylus ground is not absolutely necessary in order to feel the haptic feedback (because the user will act as a ground), but it may enhance the sensation.

It may be necessary (or at least advantageous) to discharge the active electrode between states, otherwise residual charge on the active electrode from the previous operation might adversely affect the performance of the active electrode during the subsequent operation. For example, if the active electrode was used to provide haptic feedback then it may comprise a large amount of surface charge as a result of the (relatively large) voltage that was applied to the active electrode by the electrotactile power supply. If the active electrode is then required to function as a capacitive touch sensor, the capacitance of the active electrode may exceed the measuring range of the sensor measurement circuit as a result of the surface charge, which could potentially damage the measurement circuit. To discharge the active electrode, switches SW1, SW2 and SW3 may each be set to "low". In this configuration, the active electrode is connected to ground.

Figure 10B:
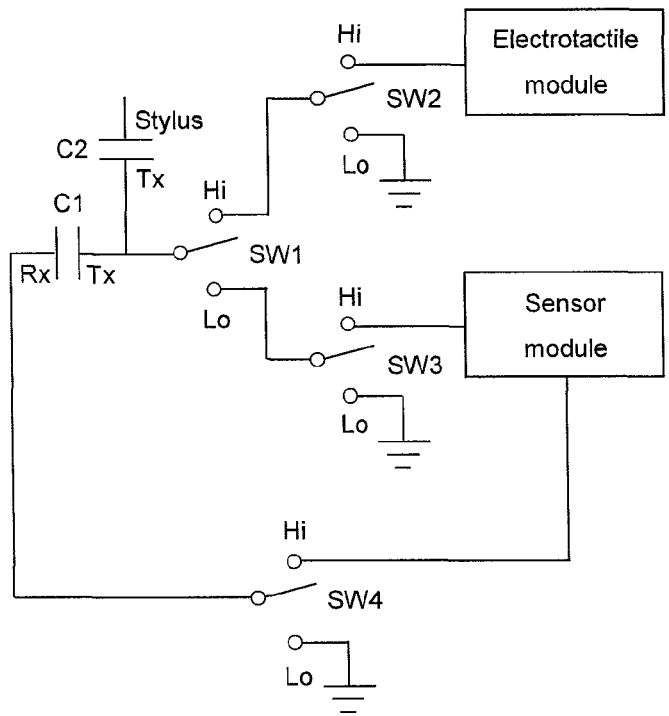
FIG. 10b shows how a series of switches can be used to enable the electrodes of a mutually-capacitive touch sensor to detect touch inputs and provide haptic feedback alternatively.

FIG. 10b shows a similar circuit diagram for controlling the transmitter and receiver electrodes of a mutually-capacitive touch sensor so that they can be used for detecting touch inputs and providing haptic feedback alternatively. In this case, the active or transmitter electrode (Tx) forms one capacitor (C1) with a receiver electrode (Rx) of the sensor, and another capacitor (C2) with the user's finger/stylus. The circuit comprises four switches (SW1-SW4) which are operated simultaneously as follows:

To use the electrodes for detecting touch inputs, switches SW1 and SW2 are set to "low", and switches SW3 and SW4 are set to "hi" (although switch SW2 could be left floating rather than being grounded). In this configuration, the electrodes are connected to a sensor module (described above). To use the electrodes for providing haptic feedback, switches SW1 and SW2 are set to "hi", and switches SW3 and SW4 are set to "low" (although switches SW3 and SW4 could be left floating rather than being grounded). In this configuration, the electrodes are connected to an electrotactile module (described above). In order to discharge the electrodes between states, switches SW1-SW4 may each be set to "low".

The circuit diagrams of FIGS. 10a and 10b show connections to a single sensor. However, the same principles may be applied to an array of sensors. This can be accomplished by multiplexing (not shown) the connection between switch SW1 and the single electrode (Cap) in FIG. 10a, and by multiplexing (not shown) the connection between switch SW1 and the transmitter electrode (Tx), and the connection between switch SW4 and the receiver electrode (Rx), in FIG. 10b.

Figure 11:
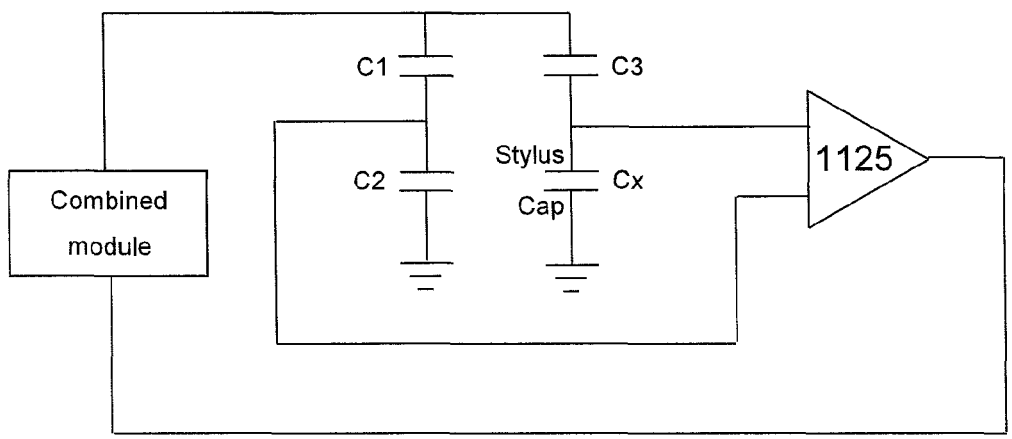
FIG. 11 shows how a comparator circuit can be used to enable the electrode of a touch sensor to detect touch inputs and provide haptic feedback simultaneously.

Rather than applying one potential (e.g. a constant potential) to the active electrode to enable the detection of touch inputs, and a different potential (e.g. a periodic potential) to the active electrode to enable the provision of haptic feedback, the same periodic potential may be applied during both operations. One way of achieving this is by using a comparator circuit, as shown in FIG. 11. The circuit comprises four capacitors (C1, C2, C3 and Cx) arranged to form a capacitive Wheatstone bridge, a differential amplifier 1125 and a combined module. Capacitor Cx is the dynamic (pseudo) capacitor formed between the user's finger/stylus and the active electrode (Cap), whilst capacitors C1, C2 and C3 are standard circuit capacitors. The capacitor values of C1, C2 and C3 are chosen such that there is negligible voltage difference across the inputs of the differential amplifier 1125 when the user's finger/stylus is not in proximity to the active electrode (i.e. under ambient conditions).

The combined module is used to apply the same alternating signal (periodic potential) to both sides of the Wheatstone bridge. When the user's finger/stylus is not in proximity to the active electrode, there is no output signal from the differential amplifier 1125. When a touch input is applied to the active electrode, however, the change in the capacitance of Cx creates a voltage difference across the inputs of the differential amplifier 1125 which is amplified and passed to the combined module. The amplified voltage difference therefore serves as the touch input signal. The combined module comprises a rectifier and an analogue-to-digital converter for converting the signal into a digital DC format which is suitable for processing. On detection/receipt of the touch input signal, a processor of the combined module varies the amplitude and/or frequency of the periodic potential to provide a haptic feedback signal which is detectable by the user. Since this signal is applied to both sides of the Wheatstone bridge, it does not affect the detection of further touch inputs. In this way, the comparator circuit is able to detect touch inputs and provide haptic feedback simultaneously.

Some users may be more susceptible to electrotactile feedback than others. Susceptibility depends on a number of factors, including the moisture content of the user's skin, the sensitivity of the mechanoreceptors, and the electrostatic potential of the user. The first two factors are difficult to control, but the third factor (electrostatic potential) can be addressed using the present apparatus. In general, the greater the potential difference between the active electrode and the user's finger/stylus, the greater the haptic sensation. Grounding the user's finger/stylus therefore ensures that a potential difference exists between the finger/stylus and the active electrode.

One way of grounding the user is to provide one or more ground electrodes. For example, the apparatus may comprise a discrete ground electrode located remote from the first, second and third touch sensor arrays. With this arrangement, the user could touch the ground electrode with one hand whilst using the other hand to provide a swipe touch gesture. A disadvantage of this approach, however, is that any charge present on the "non-grounded" hand must flow through the user's body before reaching the ground electrode. Due to the internal resistance of the user's body, not all of the charge on the non-grounded hand is likely to be removed.

Figure 12:
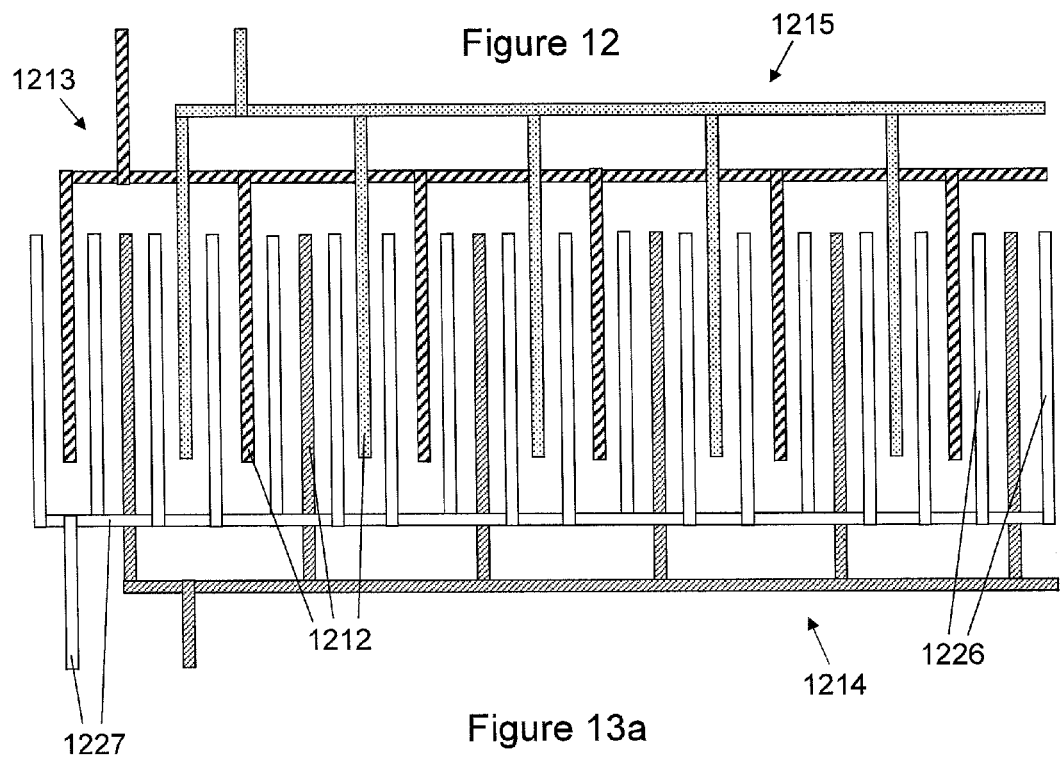
FIG. 12 shows the electrode configuration of FIG. 5 comprising a plurality of ground electrodes to enhance the sensation of haptic feedback (plan view)

Another option is to use a plurality of ground electrodes 1226 connected to a common terminal 1227 as shown in FIG. 12. The plurality of ground electrodes 1226 are interlaced between the active electrodes 1212 of the first 1213, second 1214 and third 1215 touch sensor arrays such that each active electrode 1212 is located adjacent to a ground electrode 1226 of the plurality of ground electrodes 1226. Provided that each active electrode 1212 is sufficiently close to its adjacent ground electrodes 1226, the user's finger/stylus may span the gap between an active electrode 1212 and an adjacent ground electrode 1226 when providing a touch input. In this way, the user's finger/stylus is grounded locally, thereby ensuring that any charge present on the finger/stylus is completely removed. Whilst the example shown in FIG. 12 comprises a parallel arrangement of ground electrodes 1226 (intended to function with the parallel arrangement of active electrodes 512 shown in FIG. 5), the plurality of ground electrodes 1226 could be formed as continuous spirals to enable them to be used with the active electrode configuration of FIG. 6 or 7.

Figure 1B:
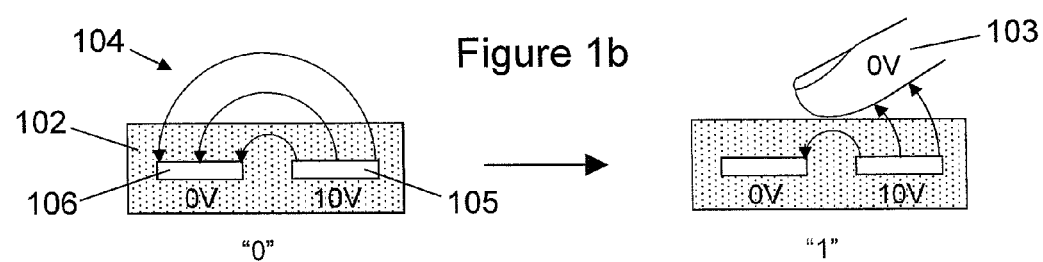
FIG. 1b shows a horizontally-arranged mutually-capacitive touch sensor.
Figure 1C:
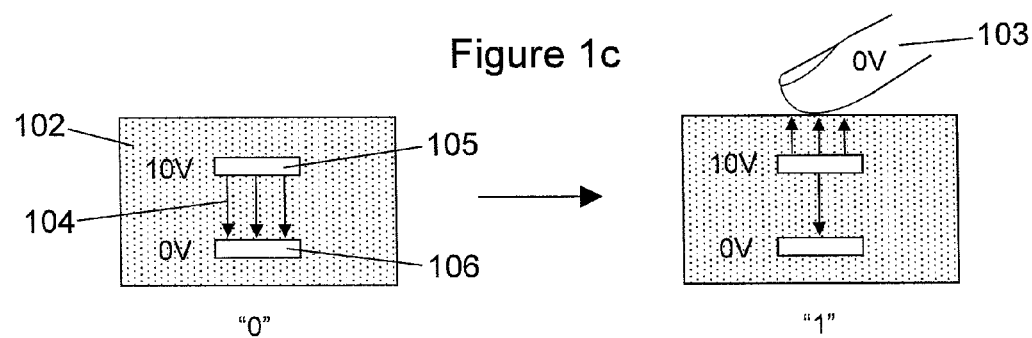
FIG. 1c shows a vertically-arranged mutually-capacitive touch sensor.

If the apparatus comprises horizontally-arranged mutually-capacitive touch sensors (as shown in FIG. 1b), then the receiver electrode 106 of each transmitter-receiver pair may be used as the adjacent ground electrode 1226. This configuration enables the receiver/ground electrode 106, 1226 to participate in the detection of touch inputs as well as in the provision of haptic feedback, and therefore simplifies the device architecture. To implement this feature, switch SW4 in FIG. 10b could be set to "low" whenever haptic feedback is required (i.e. when switches SW1, SW2 and SW3 are set to "hi", "hi" and "low", respectively).

Figure 13A:
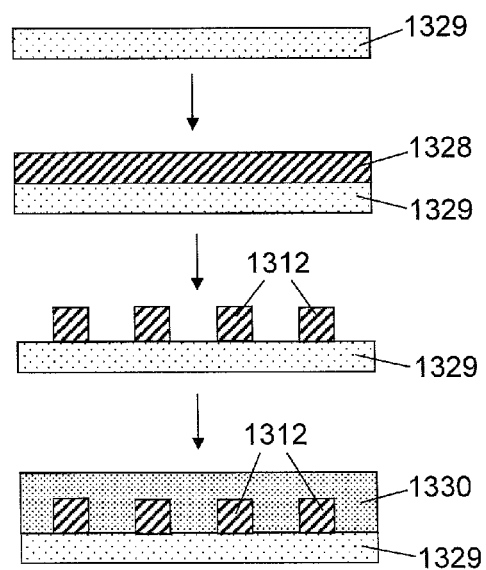
FIG. 13a shows one method of forming the apparatus described herein.

The apparatus described herein may be formed using a number of different techniques. One method, as shown in FIG. 13a, involves depositing a continuous layer of electrically conductive material 1328 (e.g. aluminium, copper, gold or silver) on top of a supporting substrate 1329 (e.g. a polymer). The continuous layer of electrically conductive material 1328 is then patterned to form the active electrodes 1312 of the first, second and third touch sensor arrays as well as any ground electrodes. Patterning of the continuous layer of electrically conductive material 1328 may be performed using photolithography or electron beam lithography in combination with a wet or dry chemical etch. This process will be familiar to a person skilled in the art and is therefore not described in any detail here. Once the continuous layer of electrically conductive material 1328 has been patterned, a layer of electrically insulating material 1330 (e.g. aluminium oxide, hafnia or a fluorinated polymer) is deposited on top of the electrodes 1312. This layer of electrically insulating material 1330 is used to prevent physical (and therefore electrical) contact between the electrodes 1312 of the apparatus and the user's finger/stylus in the end product.

Figure 13B:
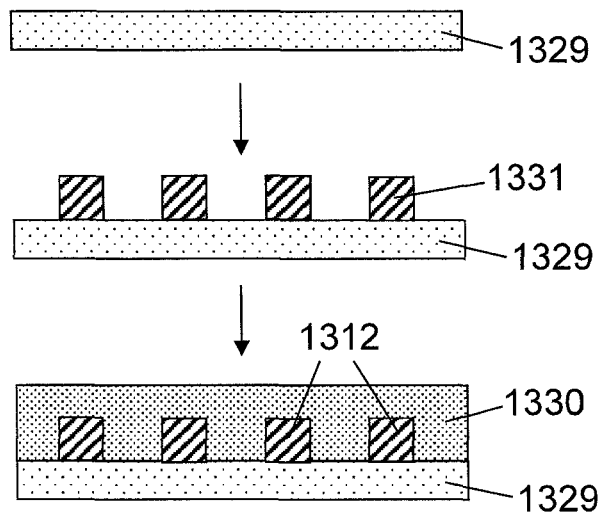
FIG. 13b shows another method of forming the apparatus described herein.

Another method of forming the apparatus, as shown in FIG. 13b, involves depositing a patterned layer of the electrically conductive material 1331 on top of the supporting substrate 1329 to form the active electrodes 1312 of the first, second and third touch sensor arrays as well as any ground electrodes. This may be performed using photolithography or electron beam lithography in combination with the lift-off technique. This process will also be familiar to a person skilled in the art and is therefore not described in any detail here. Once the patterned layer of electrically conductive material 1331 has been deposited, the layer of electrically insulating material 1330 can be deposited on top of the electrodes 1312.

It would also be possible to deposit the electrically conductive material 1328, 1331 on top of the electrically insulating material 1330 rather than on top of the supporting substrate 1329. In this scenario, the electrically insulating material 1330 would be used to support the electrically conductive material 1328, 1331 during the fabrication process, but would be used to prevent physical (and therefore electrical) contact between the electrodes 1312 and the user's finger/stylus in the end product as before. The supporting substrate 1329, on the other hand, would be used merely to provide additional mechanical rigidity to the apparatus.

A potentially useful application for the present apparatus is in electronic devices (or peripheral devices and accessories for these electronic devices) which comprise a small number of relatively basic bidirectional controls. Examples include headphones and loudspeakers which typically comprise a volume control, and electronic displays which typically comprise brightness and contrast controls. The electrode configuration described herein could be used to replace the buttons, dials, sliders and/or switches of these devices thereby providing a simple means for varying the output setting without the need for any moving parts.

The electrode arrangement may be formed from the casing of the device. This provides the advantage of a large surface area for the electrodes. For example, the electrodes could be formed over the entire outer surface of a loudspeaker enclosure (or cabinet). In this way, a user of the loudspeaker could provide a swipe touch gesture at any region of the enclosure surface to increase or decrease the volume, rather than having to interact with a physical dial or slider located at a specific location. Advantageously, the device casing would comprise a layer of aluminium with an anodized surface, as the surface oxide (alumina) provides an effective high-k dielectric for electrotactile operation, Forming the present electrode arrangement from the device casing would likely need to be performed during manufacture of the device itself. Another option, however, would be to form the electrodes on top of an existing device casing, as this would allow the present apparatus to be retrofitted to devices after manufacture (e.g. by applying a suitably adapted array patch). Either way, the resulting casing would comprise the layered structure shown in FIGS. 13a and 13b.

Given that the present apparatus could be applied to a range of different devices, it is important that the materials used to form the apparatus are compatible with the different possible form factors. For example, some device casings may have flat surfaces whilst others may have curved surfaces. In addition, some device casings may be rigid whilst others may be flexible and/or stretchable. In this respect, the materials used to form the layered structure shown in FIGS. 13a and 13b should be chosen with the specific application in mind, otherwise there is a risk that the apparatus could be damaged during use of the device.

In some embodiments (shown in FIG. 14a), the apparatus may be formed from, or on top of, the device casing 1432 such that the electrode region 1433 (i.e. the active region with which the user interacts to vary the device output setting) is raised with respect to the surrounding regions 1434 (i.e. non-active regions) of the casing 1432. In other embodiments (shown in FIG. 14b), however, the apparatus may be formed from, or on top of, the device casing 1432 such that the electrode region 1433 is lowered with respect the surrounding regions 1434 of the casing 1432. These configurations are advantageous in the sense that they facilitate tactile location of the electrode region 1433, which is particularly important if the electrically insulating material used to prevent physical contact between the user's finger/stylus and the active electrodes is optically opaque.

Figure 14A:
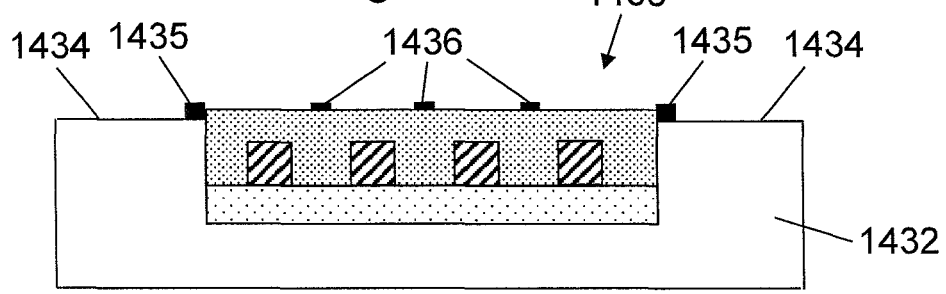
FIG. 14a shows a device casing comprising the electrode configuration described herein in a raised state.
Figure 14B:
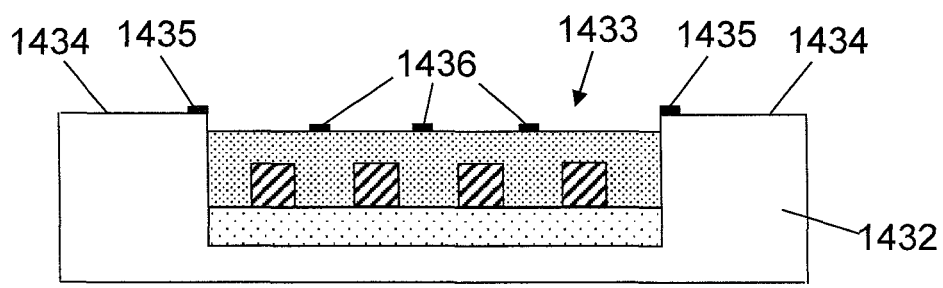
FIG. 14b shows a device casing comprising the electrode configuration described herein in a lowered state.

Additionally or alternatively, the apparatus/device may comprise physical and/or visual demarcations configured to facilitate tactile and/or visual location of the electrode region. For example, the casing of the device may comprise a line drawn/marked around the perimeter of the electrode region, and/or may comprise one or more of a depression, a protrusion and a ridge formed around the perimeter of the electrode region. In addition, the apparatus/device may comprise physical and/or visual demarcations configured to facilitate tactile and/or visual differentiation of the individual electrodes. For example, the apparatus may comprise lines drawn/marked on the layer of insulating material overlying the regions between adjacent electrodes, and/or it may comprise one or more of depressions, protrusions and ridges formed on these regions of the layer of insulating material. In FIGS. 14a and 14b, the device comprises a protrusion 1435 around the perimeter of the raised/lowered electrode region as well as protrusions 1436 between adjacent electrodes. Furthermore, in this example, the protrusions 1435, 1436 are coloured differently from the surrounding material to make them even more conspicuous to the user.

Figure 15:
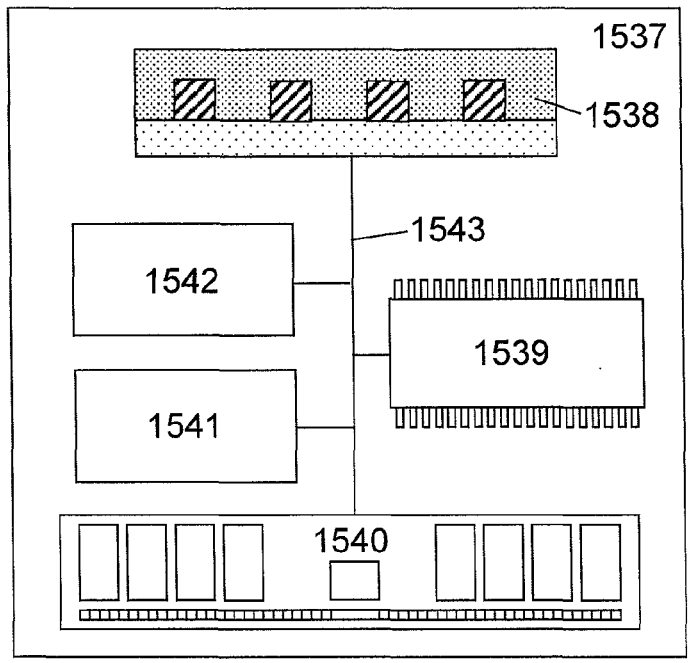
FIG. 15 shows the apparatus described herein.

FIG. 15 illustrates schematically an apparatus 1537 comprising the electrode arrangement 1538 described herein. The apparatus 1537 may be an electronic device, a portable electronic device, a portable telecommunications device, a module for any of the aforementioned devices, an accessory for any of the aforementioned devices, a casing for any of the aforementioned devices, and a protective cover for any of the aforementioned devices.

The apparatus 1537 also comprises a processor 1539, a storage medium 1540, a sensor module 1541, and an electrotactile module 1542, which are electrically connected to one another by a data bus 1543. In some embodiments (such as that shown in FIG. 11), the sensor module 1541 and electrotactile module 1542 may be combined to form a single combined module. Furthermore, the processor 1539 and storage medium 1540 may form part of the sensor module 1541, the electrotactile module 1542 or the single combined module.

The apparatus 1537 is configured to receive a swipe touch gesture at two or more adjacent active electrodes of the touch sensor arrays, and generate touch input signals at the respective common terminals of the touch sensor arrays in response to the received swipe touch gesture. The apparatus 1537 may also be configured to provide haptic feedback using the touch sensor arrays in response to the received swipe touch gesture.

The processor 1539 is configured for general operation of the apparatus 1537 by providing signalling to, and receiving signalling from, the other components to manage their operation. In particular, the processor 1539 is configured to receive the touch input signals from the respective common terminals of the sensor arrays and determine the direction of the swipe touch gesture based on these signals.

The sensor module 1541 comprises a sensor power supply, a sensor control circuit, and a sensor measurement circuit, and is used to operate the active electrodes as sensors. The sensor power supply is configured to apply a voltage to the active electrodes (via the respective common terminals), the sensor control circuit is configured to control the voltage applied to the active electrodes, and the sensor measurement circuit is configured to measure the capacitance, current or voltage associated with each of the sensor arrays (via the respective common terminals) to determine whether or not a swipe touch gesture has been received or not.

The electrotactile module 1542 comprises an electrotactile power supply, an electrotactile control circuit, and possible a stylus ground, and is used to operate the active electrodes as electrotactile elements. The electrotactile power supply is configured to apply a voltage to the active electrodes (via the respective common terminals), the electrotactile control circuit is configured to control the voltage applied to the active electrodes (e.g. the amplitude, frequency, duration and/or polarity of the electrotactile signal), and the stylus ground is configured to ground the user/stylus when the user/stylus is in proximity to the active electrodes. The stylus ground is not absolutely necessary, however, as the electrode arrangement 1538 may comprise one or more ground electrodes configured to remove any charge from the user/stylus anyway.

The storage medium 1540 is configured to store computer code configured to perform, control or enable operation of the apparatus 1537. The storage medium 1540 may also be configured to store settings for the other device components. The processor 1539 may access the storage medium 1540 to retrieve the component settings in order to manage the operation of the other device components.

In particular, the storage medium 1540 may be configured to store the operation voltages of the active electrodes for detecting touch inputs and/or for providing haptic feedback, and may be configured to store predetermined capacitance/voltage/current thresholds for use in determining whether or not a touch input has been applied. The sensor 1541 and electrotactile 1542 modules may access the storage medium 1540 to retrieve the operation voltages. The sensor module 1541 may also compare the present capacitance/voltage/current of each sensor with the predetermined threshold to determine if a touch input has occurred.

The storage medium 1540 may be a temporary storage medium such as a volatile random access memory. On the other hand, the storage medium 1540 may be a permanent storage medium such as a hard disk drive, a flash memory, or a non-volatile random access memory.

Figure 16:
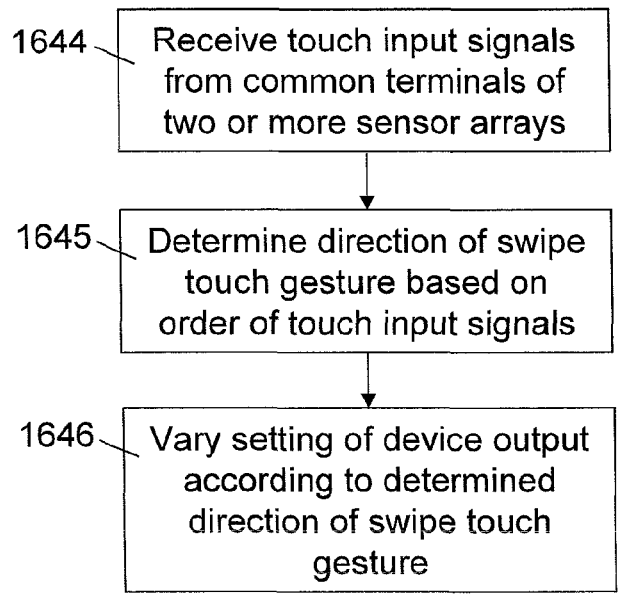
FIG. 16 shows a method of using the apparatus described herein.

The main steps 1644-1646 of a method of using the apparatus 1537 are illustrated schematically in FIG. 16.

Figure 17:
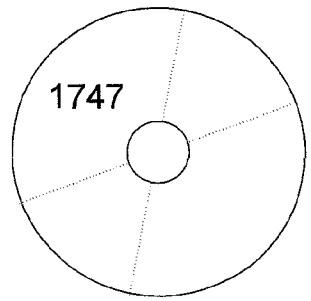
FIG. 17 shows a computer readable medium comprising a computer program for controlling use of the apparatus described herein.

FIG. 17 illustrates schematically a computer/processor readable medium 1747 providing a computer program according to one embodiment. In this example, the computer/processor readable medium 1747 is a disc such as a digital versatile disc (DVD) or a compact disc (CD). In other embodiments, the computer/processor readable medium 1747 may be any medium that has been programmed in such a way as to carry out an inventive function. The computer/processor readable medium 1747 may be a removable memory device such as a memory stick or memory card (SD, mini SD or micro SD).

The computer program may comprise computer code configured to perform, control or enable determination of the direction of a swipe touch gesture applied to two or more adjacent active electrodes of an apparatus, the apparatus comprising a plurality of adjacent repeated base units, each base unit formed from an active electrode of first, second and third touch sensor arrays, the first, second and third touch sensor arrays each comprising a plurality of active electrodes connected to a respective common terminal of the touch sensor array, wherein each base unit comprises an active electrode of the second touch sensor array interlaced between an active electrode of the first touch sensor array and an active electrode of the third touch sensor array, and wherein the direction of the swipe touch gesture is determined based on signalling generated at the respective common terminals of the corresponding touch sensor arrays by the swipe touch gesture.

The computer program may comprise computer code configured to perform, control or enable determination of the direction of a swipe touch gesture applied to two or more adjacent active electrode sections of an apparatus, the apparatus comprising a plurality of adjacent repeated base units, each base unit formed from an active electrode section of first, second and third touch sensors configured to radiate spirally, the first, second and third touch sensors each comprising a continuous active electrode connected to a respective terminal, the continuous active electrode comprising a plurality of serial electrode sections, wherein each base unit comprises an active electrode section of the second touch sensor interlaced between an active electrode section of the first touch sensor and an active electrode section of the third touch sensor, and wherein the direction of the swipe touch gesture is determined based on signalling generated at the respective terminals of the corresponding touch sensors by the swipe touch gesture.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a plurality of adjacent repeated base units, each base unit formed from an active electrode of first, second and third touch sensor arrays, the first, second and third touch sensor arrays each comprising a plurality of active electrodes connected to a respective common terminal of the touch sensor array;
   wherein each base unit comprises an active electrode of the second touch sensor array interlaced between an active electrode of the first touch sensor array and an active electrode of the third touch sensor array such that a swipe touch gesture applied to two or more adjacent active electrodes of the apparatus generates signalling at the respective common terminals of the corresponding touch sensor arrays which allows the direction of the swipe touch gesture to be determined;
   wherein the plurality of active electrodes of each touch sensor array are formed from different serial length portions of the same continuous active electrode, the continuous active electrodes of the first, second and third touch sensor arrays configured to radiate spirally to form adjacent repeated base units which allow the direction of a radial swipe touch gesture to be determined;
   wherein the configuration of the touch sensor arrays allows for the distinguishing between inward and outward radial movement;
   wherein the apparatus is configured to provide haptic feedback using the corresponding touch sensor arrays to indicate that a device output setting has been varied;
   wherein the apparatus is configured to provide the haptic feedback by applying a periodic potential to the active electrodes of the corresponding touch sensor arrays via the respective common terminals, and wherein the amplitude and/or frequency of the periodic potential is indicative of the device output setting;
   wherein the haptic feedback is a series of electrical pulses of short duration that, when grouped together with other pulses of similar duration, provide a perceived frequency of vibration;

wherein the apparatus is configured to apply a periodic potential to the first, second and third touch sensor arrays via the respective common terminals to enable the swipe touch gesture to generate signalling at the respective common terminals of the corresponding touch sensor arrays;

wherein the periodic potential applied to the touch sensor arrays to enable the swipe touch gesture to generate signalling is different for at least two touch sensor arrays to provide a sequence of vibrations of different frequencies.

2. The apparatus of claim 1, wherein the two or more adjacent active electrodes to which the swipe touch gesture is applied are two or more adjacent active electrodes of a single base unit, or two or more adjacent active electrodes spanning multiple adjacent base units.

3. The apparatus of claim 1, wherein the plurality of active electrodes of each touch sensor array are formed from different parallel length portions of the same continuous active electrode, the different parallel length portions of each touch sensor array configured to extend parallel from the common terminal of the respective touch sensor array to form adjacent repeated base units which allow the direction of an axial swipe touch gesture to be determined.

4. The apparatus of claim 1, wherein the apparatus is configured to monitor the sequence in which the signalling was generated at the respective common terminals of the corresponding touch sensor arrays to determine the direction of the swipe touch gesture.

5. The apparatus of claim 1, wherein the respective common terminals are input and/or output terminals of the first, second and third touch sensor arrays.

6. The apparatus of claim 1, wherein the apparatus is configured to vary the setting of a device output according to the determined direction of the swipe touch gesture.

7. The apparatus of claim 6, wherein the device output is one or more of the volume of a loudspeaker, the frequency response of an audio equalizer, the playback progress of an audio recording, the playback progress of a video recording, the brightness of an electronic display, the contrast of an electronic display, and the currently displayed visual content of an electronic display.

8. The apparatus of claim 1, wherein each active electrode is configured to couple capacitively to a stylus when the stylus is in proximity to the active electrode, capacitive coupling between the active electrode and the stylus configured to generate a touch input signal.

9. The apparatus of claim 1, wherein the apparatus comprises a discrete ground electrode located remote from the first, second and third touch sensor arrays.

10. The apparatus of claim 1, wherein the apparatus comprises a plurality of ground electrodes connected to a respective common terminal, and wherein the plurality of ground electrodes are interlaced between the active electrodes of the first, second and third touch sensor arrays such that each active electrode is located adjacent to a ground electrode of the plurality of ground electrodes.

11. The apparatus of claim 1, wherein the apparatus is one or more of an electronic device, a portable electronic device, a portable telecommunications device, a module for any of the aforementioned devices, an accessory for any of the aforementioned devices, a casing for any of the aforementioned devices, and a protective cover for any of the aforementioned devices.

12. The apparatus of claim 11, wherein the first, second and third touch sensor arrays are formed from, or on top of, the casing.

13. The apparatus of claim 11, wherein the casing comprises physical and/or visual demarcations configured to enable location of the first, second and third touch sensor arrays.

14. A method comprising determining the direction of a swipe touch gesture applied to two or more adjacent active electrodes of an apparatus, the apparatus comprising a plurality of adjacent repeated base units, each base unit formed from an active electrode of first, second and third touch sensor arrays, the first, second and third touch sensor arrays each comprising a plurality of active electrodes connected to a respective common terminal of the touch sensor array;

wherein each base unit comprises an active electrode of the second touch sensor array interlaced between an active electrode of the first touch sensor array and an active electrode of the third touch sensor array;

wherein the direction of the swipe touch gesture is determined based on signalling generated at the respective common terminals of the corresponding touch sensor arrays by the swipe touch gesture;

wherein the plurality of active electrodes of each touch sensor array are formed from different serial length portions of the same continuous active electrode, the continuous active electrodes of the first, second and third touch sensor arrays configured to radiate spirally to form adjacent repeated base units which allow the direction of a radial swipe touch gesture to be determined;

wherein the configuration of the touch sensor arrays allows for the distinguishing between inward and outward radial movement;

wherein the apparatus is configured to provide haptic feedback using the corresponding touch sensor arrays to indicate that a device output setting has been varied;

wherein the apparatus is configured to provide the haptic feedback by applying a periodic potential to the active electrodes of the corresponding touch sensor arrays via the respective common terminals, and wherein the amplitude and/or frequency of the periodic potential is indicative of the device output setting;

wherein the haptic feedback is a series of electrical pulses of short duration that, when grouped together with other pulses of similar duration, provide a perceived frequency of vibration;

wherein the apparatus is configured to apply a periodic potential to the first, second and third touch sensor arrays via the respective common terminals to enable the swipe touch gesture to generate signalling at the respective common terminals of the corresponding touch sensor arrays;

wherein the periodic potential applied to the touch sensor arrays to enable the swipe touch gesture to generate signalling is different for at least two touch sensor arrays to provide a sequence of vibrations of different frequencies.

15. A non-transitory computer-readable storage medium comprising a computer program comprising computer code configured to perform the method of claim 14.

* * * * *